March 8, 1932. M. F. BARNES 1,848,598
EDUCATIONAL TOY
Filed Sept. 26, 1929

Inventor
Mary F. Barnes,
By Robert M. Pierson,
Attorney

Patented Mar. 8, 1932

1,848,598

UNITED STATES PATENT OFFICE

MARY F. BARNES, OF HUDSON, OHIO

EDUCATIONAL TOY

Application filed September 26, 1929. Serial No. 395,369.

This invention relates to educational toys, and its objects are to amuse as well as to instruct in the use of a hammer or mallet and to develop various physical and mental faculties such as coordination of mind and body, selection and adaptation of sizes and colors of the parts employed in the toy, the removal of tight-fitting members once inserted, the integration of structures, the gathering of parts in a receptacle, etc.

The toy is intended primarily for the use of children of about two to six years of age. In its preferred embodiment it includes a structure such as a board which may form the top wall of a box in which parts and accessories can be stored when not in use, said board being formed with a number of through apertures, together with a corresponding number of tight-fitting pins, dowels or pegs adapted to be driven through said apertures. By arranging the apertures in groups or rows of graded sizes, with the apertures in each group of uniform size, and preferably having different colored pins for the several sizes, the toy may be used in a number of different ways as hereinafter pointed out.

Of the accompanying drawings.

Figure 1:
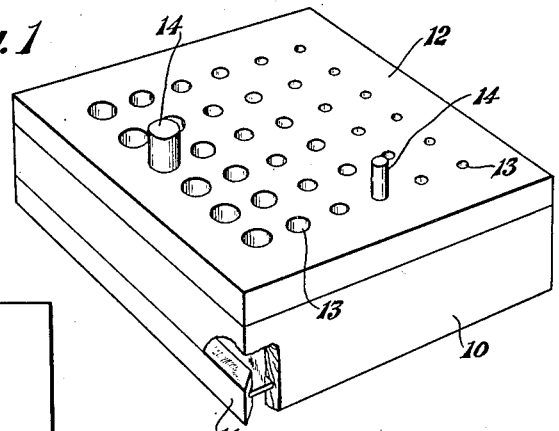
Fig. 1 is a perspective view partly broken away and in section, showing a preferred embodiment of my invention with two of the pins in place.
Figure 2:
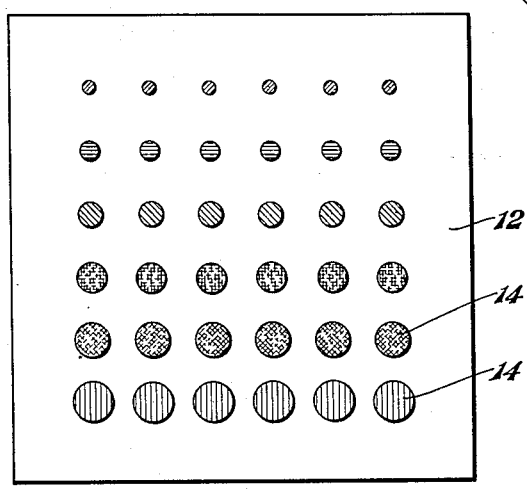
Fig. 2 is a top plan view showing the board with a full complement of pins having various colored ends.

The holes and pins may be of any desired shape in cross section, the holes may be variously grouped in a board or in one or more walls of a box, the pins may be of different colors or all of one color, the coloring may be uniform or otherwise in each pin and may be placed in any location thereon such as the ends, the box, when one is employed, may have a sliding lid or other suitable type of movable cover and the features of construction and arrangement may be otherwise varied within the scope of my invention. While I have illustrated a preferred embodiment employing cylindrical apertures in the top of the box only and correspondingly-shaped pins of uniform length for the sake of cheapness of manufacture, and have represented a simple arrangement of rows of apertures of graded sizes in the different rows, I do not wish to be wholly confined to this embodiment.

In the drawings, 10 is a square wooden box body whose lower wall is formed by a sliding lid or cover 11. 12 is the top wall of said body consisting of a board of sufficient thickness to withstand the hammering action and the driving of the pins and 13, 13 are cylindrical holes or apertures vertically drilled through said board. 14, 14 are cylindrical wooden pins or dowels which fit in the apertures with sufficient tightness to require a hammering action to drive them into and through the apertures. Any convenient object may be used for hammering but a mallet 15 having a head composed of or faced with rubber is preferred in order to reduce the noise and liability to injury of the child or the toy.

The holes 13 are arranged in a number of rows varying in size or diameter of aperture through any desired number of gradations such as six in the illustration given. Any number of holes may be employed in each row, six for example as here shown. The pins will correspond in number and size to the full complement of holes and they may be of uniform length, although this is not essential.

While plain or uniformly colored pins could be used, I prefer to color all of the pins in one row with the same color and to make the pins in each row of a different color from those in the other rows. With six rows of pins for example, the six primary colors, violet, blue, green, yellow, orange and red may be employed and the pins are conveniently colored on their ends only so that the colors will show when they are driven in flush with the top of the box.

Figure 4:
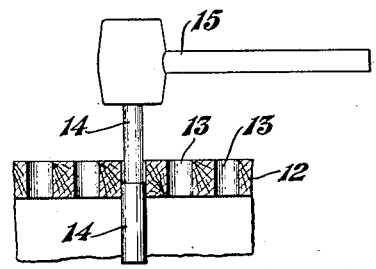
Fig. 4 is a partial vertical section on a smaller scale showing the operation of driving out one of the pins with a smaller one.
Figure 3:
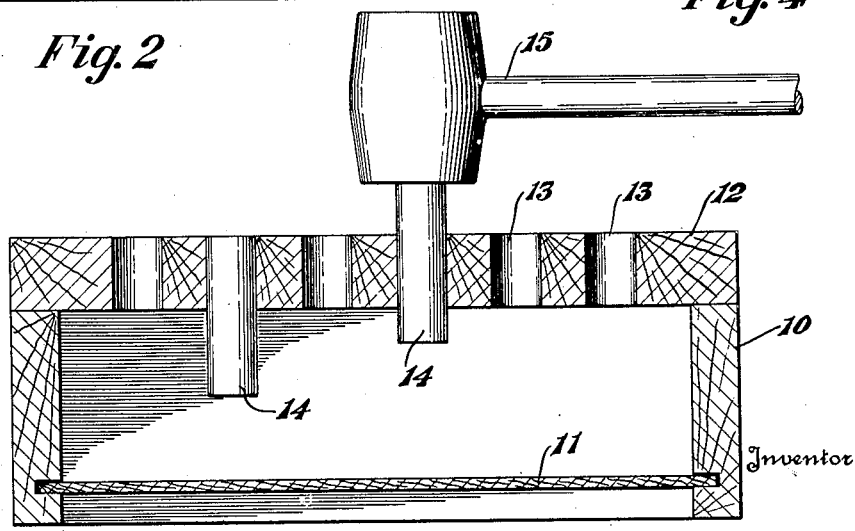
Fig. 3 is a vertical section on a larger scale illustrating the use of a mallet in driving one of the pins.

It will be apparent that the use of this invention teaches the child the coordination of its mental and physical faculties in the act of hammering the pins and driving them into and through the apertures. After a pin has been driven in flush with the board 12, it may be driven out into the interior of the box with any pin of a smaller size used as a driver as illustrated in Fig. 4. With a full set of these pins, one additional pin of a size smaller than the smallest ones of the set may be furnished for driving out said smallest pins.

The use of the toy also teaches the selection of sizes and fitting of pins to their proper holes, and it instructs in the sense of number or count to get the full complement or a definite smaller complement of pins in each row. By using less than the full number of pins in some regular order or arrangement, various designs may be formed. It is also possible to drive the pins to different depths in each row or in the several rows and thus form various designs depending upon the amount of projection, or to drive them below the top face of the board 12 and thus attain different arrangements of more or less sunken pins, with or without a partial arrangement of projecting pins. With pins whose ends are at right angles to their axes as illustrated, they may be stacked on end one above another. Various integrated structures may be built, especially with the use of accessories such as loose flat boards or cards, which can be placed on supporting pins partially driven into some of the holes in the board 12, and a further structure such as one made with other pins and cards erected thereover, etc. The child can invent various ways of using the toy along the lines described or otherwise.

The interior of the box 10 forms a convenient receptacle for storing the pins 14 as in a net bag or otherwise, when not in use, together with the mallet 15, cards and/or other accessories, and the child may learn therefrom to gather and keep these parts in the box.

The materials, of course, may be varied and the details otherwise changed within the scope of my invention as above indicated.

I claim:

1. An educational toy comprising a board formed with a series of through apertures of the same shape but of different sizes, a series of tight-fitting pins of corresponding sizes and of greater length than breadth, each adapted to be driven by hammering into its mating aperture and entirely through said aperture with the aid of a smaller pin of the series, and supporting means providing a clear space below the board of a depth greater than the length of the pins.

2. An educational toy comprising a board formed with a multiplicity of rows of through apertures and a corresponding number of parallel-sided pins tightly fitting said apertures and adapted to be driven therethrough, the apertures in each row and the corresponding pins being of the same size, and all of the rows differing from each other in size of apertures and pins.

3. An educational toy comprising a structure formed with a series of apertures of different sizes, and a series of tight-fitting pins of corresponding sizes adapted to be driven into and through said apertures, all of the pins of one size being colored on the end with one color, and the colors differing for the different sizes.

4. An educational toy comprising a board formed with a number of groups of cylindrical through apertures of the same diameter in each group and of graded diameters in the different groups, and a series of tight-fitting cylindrical pins of corresponding diameters adapted to be driven through said apertures.

5. An educational toy comprising a board formed with a multiplicity of rows of cylindrical through apertures of the same diameter in each row and of graded diameters in the different rows, and a series of tight-fitting cylindrical pins of corresponding diameters adapted to be driven through said apertures, the pins for each row having a distinctive color which differs from the color of the pins for the other rows.

6. An educational toy comprising a board formed with a multiplicity of apertures all of the same shape arranged in a series of groups wherein the members of each group are all of the same size and the members of the different groups are of different sizes, supporting means for said board providing a clear space below the latter for the reception of pins driven through the board, and a multiplicity of pins corresponding in size to said holes and each adapted to fit any one of the holes in its group with a tightness requiring the use of a hammer to drive it, the pins having a length greater than their breadth and greater than the length of the holes but less than the depth of the space provided below the board by said supporting means, each pin of any of the groups of larger holes being drivable clear through the board by one of the smaller pins.

In witness whereof I have hereunto set my hand this 20th day of September, 1929.

MARY F. BARNES.